(12) United States Patent
Shechter (10) Patent No.: US 9,324,142 B2
(45) Date of Patent: Apr. 26, 2016

(54) MULTI-ENERGY IMAGING

(75) Inventor: Gilad Shechter, Haifa (IL)

(73) Assignee: KONINKLIJKE PHILIPS N.V., Eindhoven (NL)

(\*) Notice: Subject to any disclaimer, the term of this patent is extended or adjusted under 35 U.S.C. 154(b) by 309 days.

(21) Appl. No.: 14/113,821

(22) PCT Filed: Apr. 13, 2012

(86) PCT No.: PCT/IB2012/051828
§ 371 (c)(1),
(2), (4) Date: Oct. 25, 2013

(87) PCT Pub. No.: WO2012/147004
PCT Pub. Date: Nov. 1, 2012

(65) Prior Publication Data
US 2014/0056503 A1    Feb. 27, 2014

Related U.S. Application Data

(60) Provisional application No. 61/480,009, filed on Apr. 28, 2011.

(51) Int. Cl.
*G06K 9/00* (2006.01)
*G06T 7/00* (2006.01)
*G06T 11/00* (2006.01)

(52) U.S. Cl.
CPC .............. *G06T 7/0012* (2013.01); *G06T 11/005* (2013.01)

(58) Field of Classification Search
None
See application file for complete search history.

(56) References Cited

U.S. PATENT DOCUMENTS

| | | | |
|---|---|---|---|
| 4,029,963 A | 6/1977 | Alvarez et al. | |
| 5,155,365 A | 10/1992 | Cann et al. | |
| 6,683,934 B1 | 1/2004 | Zhao et al. | |
| 7,298,812 B2 | 11/2007 | Tkaczyk et al. | |
| 2005/0084069 A1 | 4/2005 | Du et al. | |
| 2006/0109949 A1 | 5/2006 | Tkaczyk et al. | |
| 2006/0259282 A1* | 11/2006 | Failla | A61N 5/1031 703/2 |
| 2008/0253508 A1 | 10/2008 | Krauss | |
| 2009/0092219 A1* | 4/2009 | Wu | A61B 6/032 378/5 |
| 2009/0262997 A1 | 10/2009 | Zou et al. | |
| 2010/0014737 A1 | 1/2010 | Ruhrnschopf et al. | |
| 2010/0128844 A1* | 5/2010 | Thomsen | A61B 6/032 378/53 |
| 2010/0135557 A1 | 6/2010 | Krauss et al. | |
| 2010/0328313 A1 | 12/2010 | Zamyatin et al. | |

FOREIGN PATENT DOCUMENTS

| | | |
|---|---|---|
| JP | 2010082031 A | 4/2010 |
| WO | 9409383 A1 | 4/1994 |

OTHER PUBLICATIONS

Carmi et al: "Material Separation With Dual-Layer CT"; 2005 IEEE Nuclear Science Symposium Conference Record,pp. 1876-1879.
Alvarez et al: "Energy-Selective Reconstructions in X-Ray Computerized Tomography" Phys. Med. Biol., vol. 21, No. 5, pp. 733-744, 1976.

\* cited by examiner

*Primary Examiner* — Stephen R Koziol
*Assistant Examiner* — Amandeep Saini (57) ABSTRACT

A method includes generating landmarks, for different compositions of materials in scanned structure, wherein a landmark represents a location of a composition of materials, distorted by beam hardening, in a multi-energy Hounsfield Unit space and using the landmarks to perform an image domain material separation and quantification free of beam hardening artifacts.

19 Claims, 6 Drawing Sheets

MULTI-ENERGY IMAGING

CROSS-REFERENCE TO PRIOR APPLICATIONS

This application is the U.S. National Phase application under 35 U.S.C. §371 of International Application No. PCT/IB2012/051828, filed on Apr. 13, 2012, which claims the benefit of U.S. Provisional Patent Application No. 61/480,009, filed on Apr. 28, 2011 These applications are hereby incorporated by reference herein in their entirety.

FIELD OF THE INVENTION

The following generally relates to multi-energy imaging and is described with particular application to computed tomography (CT); however, the following is also amenable to other imaging modalities.

BACKGROUND OF THE INVENTION

In a dual energy CT imaging, the Hounsfield unit (HU) of non-water materials may have different values depending on the size and composition of the scanned object due to beam-hardening effects. As a consequence, the location of specific materials like Iodine contrast on the dual energy HU-HU plane may vary and depends on the composition and size of the patient. This phenomenon may degrade the material classification and quantification within the patient. The following two approaches have been proposed to reduce such degradation.

"Material separation with dual layer CT," R. Carmi, G. Naveh and A. Altman, IEEE Nuclear Science Symposium records (2005), proposes correcting, in the image domain, on the bases of calculating, for each image pixel, a mean beam hardening factor. The instability mentioned above is sensitively dependent on the interplay between the beam hardening and the energy attenuation profile of the material under consideration, e.g. Iodine. This image domain approach does not take into account this interplay, and, therefore, unfortunately, suffers from a limited accuracy and robustness.

R. E. Alvarez and A. Macovski, Phys. Med. Biol. 21, 733 (1976), proposes a two-base model that includes decomposing the attenuation coefficient within the projection domain into two components resulting from scatter and photoelectric effect absorption. According to this model, the attenuation energy dependent profile of different materials is represented as a linear combination of scatter and photoelectric effect profiles united for all the materials. Unfortunately, the limited accuracy of this approximation, combined with beam hardening, limits the accuracy and the robustness of this approach.

Figure 1:
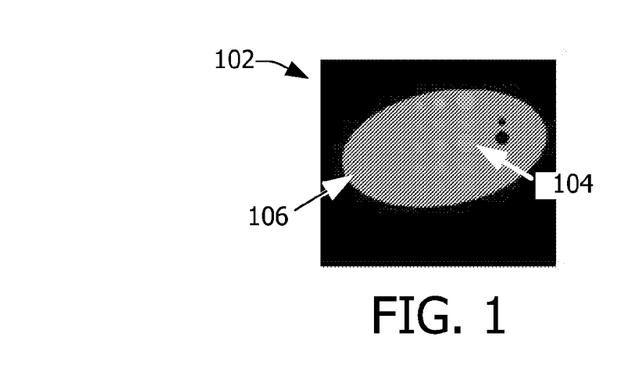
FIGS. 1, 2 and 3 illustrate beam hardening artifact in connection with a prior art two-base decomposition approach.
Figure 2:
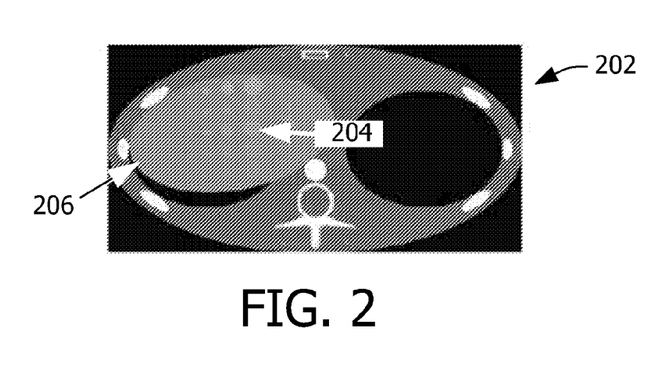
Figure 3:
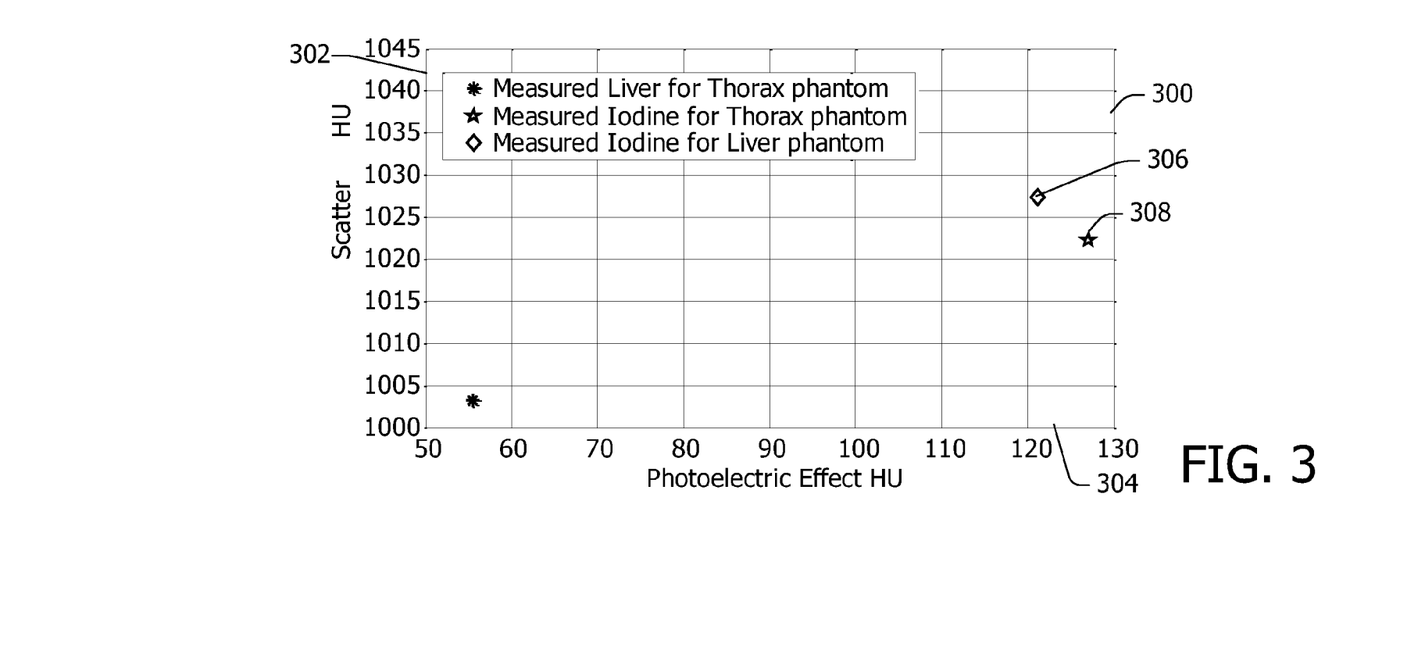

FIGS. 1, 2 and 3 illustrate how the limited accuracy of the latter approach may lead to beam hardening distortions. For this example, two simulated phantoms, a liver phantom 102 (FIG. 1) and a liver and a thorax phantom 202 (FIG. 2), include the same concentration of Iodine 104 and 204 in liver organs 106 and 206. A single slice circular scan of these phantoms was simulated for 80 and 140 kVp, followed by a water-based correction and a projection domain decomposition for the water scatter and photoelectric effect components. Note that the results of the simulations mimic or parallel the results that would be obtained by performing an actual scan.

FIG. 3 shows the resulting locations of Iodine solutions for the two different materials on a dual energy scatter/photoelectric effect HU-HU plane 300. In FIG. 3, a y-axis 302 represents scatter HU and an x-axis 304 represents photoelectric effect HU. The approximation embedded, when applying the two base model to Iodine, which has a K-edge within the relevant energy range, has limited accuracy. Due to this limited accuracy, combined with beam hardening distortions, Iodine points 306 and 308, although the same concentration, are located at different (x, y) coordinates for the two different phantoms 102 and 202. In view of at least the above, there is an unresolved need for other approaches for processing multi-energy imaging data which mitigate such beam hardening distortions.

SUMMARY OF THE INVENTION

Aspects of the present application address the above-referenced matters and others.

According to one aspect, a method includes generating landmarks, for different compositions of materials in scanned structure, wherein a landmark represents a location of a composition of materials, distorted by beam hardening, in a multi-energy Hounsfield Unit space and using the landmarks to perform an image domain material separation and quantification.

In another aspect, a system includes a line integral calculator configured to calculate line integrals based on collected line integrals decomposed into at least two different components, an artificial path length of a material of interest, an attenuation profile of the material of interest, and polychromatic spectra at the multiple energies. The system further includes a decomposer that decomposes the collected line integrals as well as the line integrals calculated by the line integral calculator into at least two different components. The system further includes a displacement vector determiner that subtracts decomposed collected line integral components from the decomposed calculated line integral components, generating difference decomposed line integral components. The system further includes a displacement vector determiner that divides the difference decomposed line integral components by the artificial path length. The system further includes a back-projector that back-projects the difference decomposed line integral components. The system further includes a scaler that scales the back-projected difference decomposed line integral components into Hounsfield units, generating landmarks. A landmark represents a location of a composition of materials, distorted by beam hardening, in a multi-energy Hounsfield Unit space.

In another aspect, computer readable storage medium encoded with computer readable instructions, which, when executed by a processor of a computing system, causes the processor to: utilize the images reconstructed from the collected line integrals decomposed components, as well as, the calculated landmarks to perform an image domain material separation and quantification that is substantially free of beam hardening artifact.

Still further aspects of the present invention will be appreciated to those of ordinary skill in the art upon reading and understand the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF EMBODIMENTS

Figure 4:
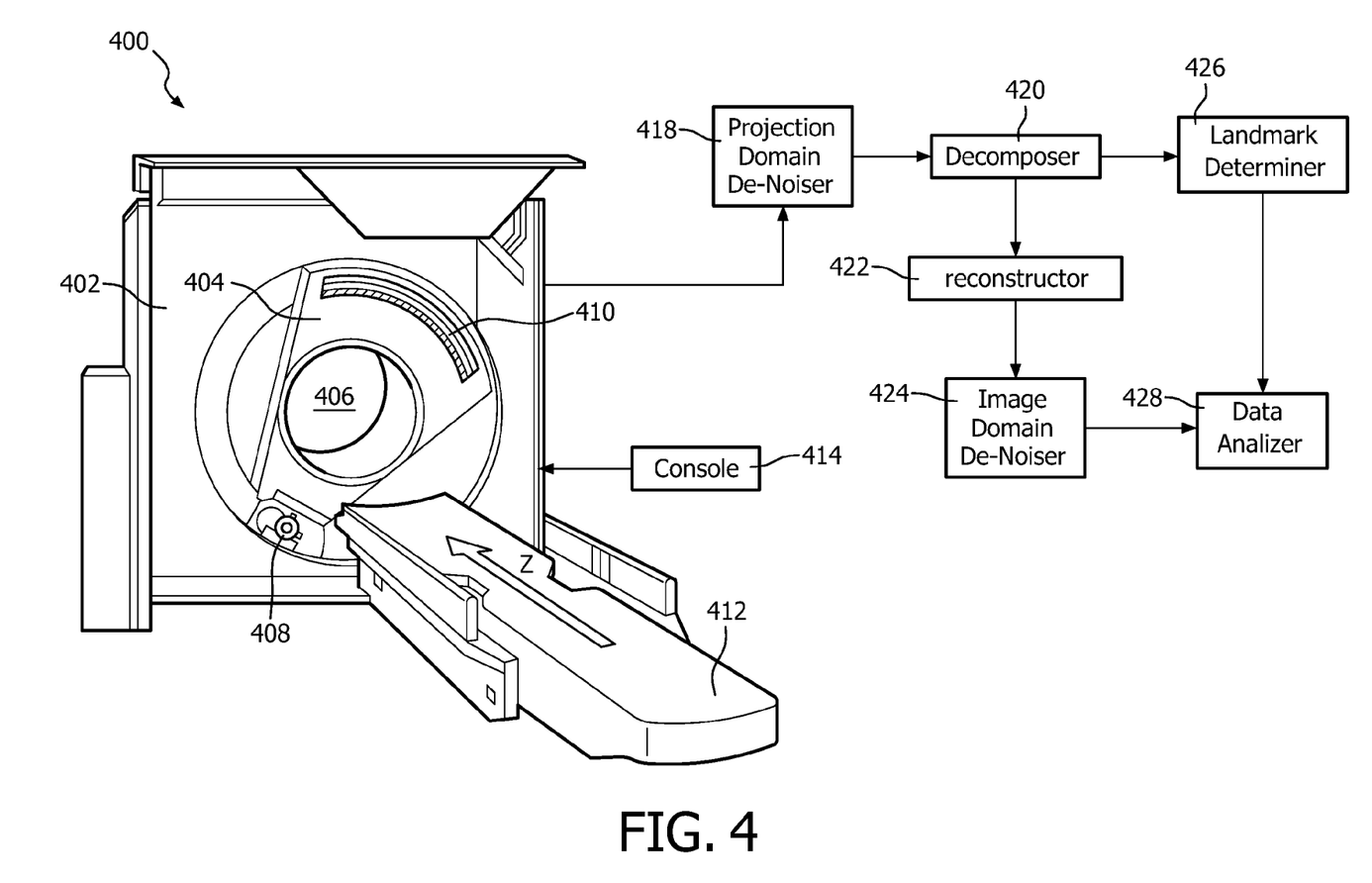
FIG. 4 schematically illustrates an example imaging system in connection with a landmark determiner.

FIG. 4 illustrates an example spectral imaging system 400 such as a spectral computed tomography (CT) system.

The imaging system 400 includes a generally stationary gantry 402 and a rotating gantry 404, which is rotatably supported by the stationary gantry 402. The rotating gantry 404 rotates around an examination region 406 about a longitudinal or z-axis.

A radiation source 408, such as an x-ray tube, is supported by the rotating gantry 404 and emits radiation, which is collimated to produce a generally cone, fan, wedge, or otherwise shaped radiation beam that traverses the examination region 406 and the portion of the subject or object disposed therein. The radiation source 408 is configured to switch between at least two different peak emission spectra (e.g., 80 and 140 kVp) for scanning. In another embodiment, the system 400 may additionally or alternatively include multiple sources 408 in which one or more of the sources 408 may or may not be configured for kVp switching.

A radiation sensitive detector array 410 includes a one or two dimensional array of detectors configured to detect radiation traversing the examination region 406 and generate an electrical signal indicative thereof. The detectors may include conventional detectors or energy-resolving spectral detectors such as multi-layer detectors (in which each layer is configured to detect photons corresponding to different predetermined energy ranges), photon counting detectors, and/or other spectral detectors. Where the array 410 is configured with spectral detectors, the source 408 may alternatively be a single non-kVp switching source 408.

A subject support 412 such as a couch supports a human or animal patient or an object in the examination region 406. The subject support 412 is movable in coordination with scanning so as to guide the subject or object with respect to the examination region 406.

A general purpose computer serves as an operator console 414. The console 414 includes a human readable output device such as a monitor or display and an input device such as a keyboard and mouse. Software resident on the console 414 allows the operator to interact with the system 400 via a graphical user interface (GUI) or otherwise to control the system 400.

A projection domain de-noiser 418 can be used to de-noise the line integrals. In one instance, this may improve SNR. A suitable de-noising algorithm includes, but is not limited to, a total variation minimization algorithm. In another embodiment, the projection domain de-noiser 418 is omitted.

A decomposer 420 decomposes the collected line integrals into at least two components based on the polychromatic spectra at the different energies. In the illustrated embodiment, the decomposer 420 is configured to decompose the line integrals into photoelectric effect and scatter components based on a pre-calculated look up table (LUT). In another embodiment, the decomposer 420 can be configured to decompose the signal into other components such as water and Ultravist, water and bone, and/or other decompositions.

A reconstructor 422 reconstructs the decomposed line integrals into images. In one instance, this includes reconstructing the photoelectric effect and scatter components individually and/or in combination.

An image domain de-noiser 424 can be used to de-noise the reconstructed images in the image domain. Likewise, suitable de-noising algorithm includes, but is not limited to, a total variation minimization algorithm. In another embodiment, the image domain de-noiser 424 is omitted.

It is to be appreciated that the decomposer 420 performs a conventional two-base model projection domain decomposition.

A landmark determiner 426 determines landmarks, or points for the locations of different materials on a multi-energy HU space. Such landmarks can be well defined once specific scanned object collected data and image pixel position are taken properly into account. As described in greater detail below, the landmark determiner 426 determines the landmarks based on an artificial addition of a constant path length of material along the line integrals.

Generally, each landmark predicts a measured point for a pixel that would have been obtained if the true object composition, only at the location of this pixel, had been replaced by the material. This calculation is done, taking into account the beam hardening in practice, which depends by its own on the specific patient size and shape. As a result, the landmarks can be used as reference points for mitigating beam hardening influence during material separation and quantification.

A data analyzer 428 is configured to perform an image domain material separation and/or quantification based on the determined landmarks. Such an analysis is essentially free of beam hardening distortions. An example of the data analyzer 428 output includes an Iodine map showing the concentration of Iodine in the scanned structure.

It is to be appreciated that one or more of the projection domain de-noiser 418, the decomposer 420, the reconstructor 422, the image domain de-noiser 424, the landmark determiner 426, or the data analyzer 428 can be implemented via one or more processors executing one or more computer readable and/or executable instructions embedded or encoded on computer readable storage medium such as physical memory. Additionally or alternatively, the one or more processor can execute instructions carried in signal medium.

Figure 5:
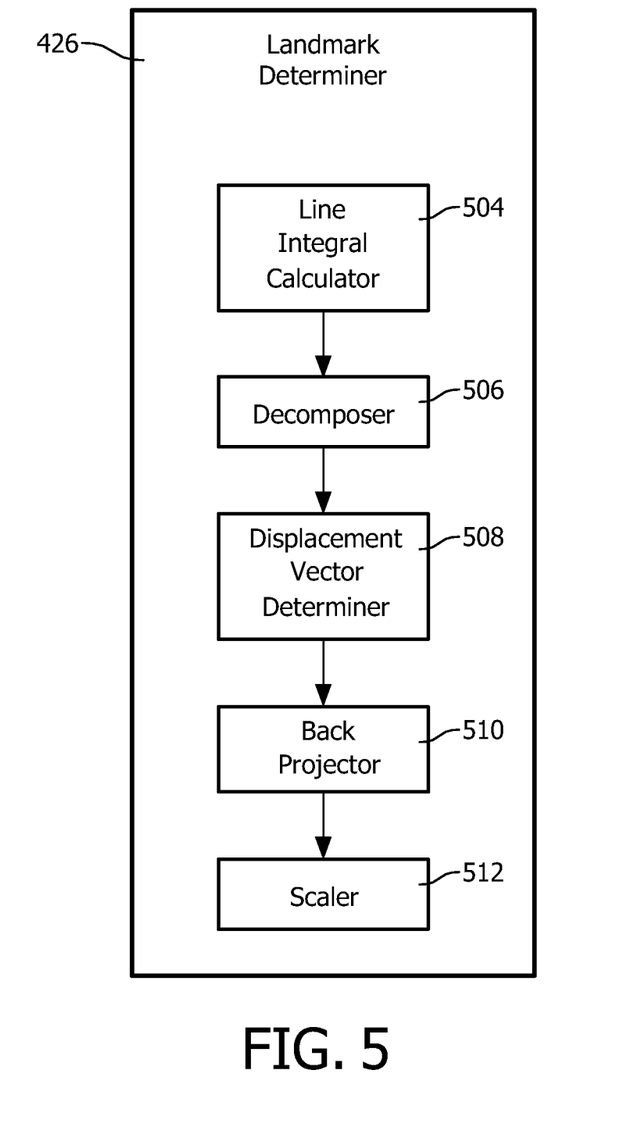
FIG. 5 illustrates an example of the landmark determiner.

FIG. 5 illustrates an example of the landmark determiner 426.

A line integral calculator 504 calculates line integrals, adding an artificial constant path length of material along the collected line integral, based on the decomposed collected line integrals, suitable material composition attenuation profiles, and the polychromatic spectra at the different energies.

A decomposer 506 decomposes the line integrals obtained with adding the artificial constant path, into at least two components based on the polychromatic spectra at the different energies. In the illustrated embodiment, the decomposer 506 is configured to decompose the line integrals into photoelectric effect and scatter components based on the pre-calculated look up table (LUT) used by the decomposer 420 (FIG. 4).

A displacement vector determiner 508 determines a displacement vector between the decomposed collected line integrals and the decomposed line integrals calculated by 506 adding the artificial constant path. In one instance, this includes determining a difference (e.g., subtracting) between the line integrals corresponding to the photoelectric effect and determining a difference between the line integrals corresponding to the scatter. In the illustrated embodiment, the displacement vector determiner also divides the differences obtained by subtraction by the constant path length of material used in 504.

A back projector 510 back-projects the line integrals. In one instance, this includes back-projecting the line integrals into a course grid (e.g., a pixel size of 40 mm) used for an angular averaging.

A scaler 512 scales the back-projected images to Hounsfield units, obtaining the landmarks. The landmarks can be calculated using a sub-matrix of pixels of the image and interpolation of other technique can be used to generate landmarks for the remaining pixels of the image.

The following provides an example description of the two-base model (TBM) performed by the decomposer 420 and the reconstructor 422.

The energy dependent attenuation profile of each material of interest can be approximated as a linear combination of the attenuation profiles of the photoelectric and scatter mechanisms in water, as shown in EQUATION 1:

$$\mu_i(E) = C_i^p \cdot \mu_w^p(E) + C_i^s \cdot \mu_w^s(E), \quad \text{EQUATION 1}$$

wherein E represents photon energy, i represents an index of the material, $\mu_w^p(E)$ represents an attenuation profile of the water attenuation component originating from the photoelectric effect, $\mu_w^s(E)$ represents an attenuation profile of the water attenuation component originating from the scatter, $C_i^p$ represents material dependent coefficients of material i from the photoelectric effect that is energy independent, and $C_i^s$ represents material dependent coefficients of material i from the scatter that is energy independent.

The line integral (P) of attenuation coefficients measured in CT can be represented as shown in EQUATION 2:

$$P = -\log\left(\frac{\int_0^\infty dE\, E \cdot F(E) \cdot \exp\left(-\int dl\, \mu_l(E)\right)}{\int_0^\infty dE\, E \cdot F(E)}\right), \quad \text{EQUATION 2}$$

wherein F(E) represents photon flux emitted towards the detector pixel from the tube, and l represents the coordinate along the path of the ray. Replacing $C_i^p$ with $C_l^p$, and replacing $C_i^s$ with $C_l^s$, to represent the different materials along the ray, and substituting EQUATION 1 in EQUATION 2, renders EQUATION 3:

$$P = -\log\left(\frac{\int_0^\infty dE\, E \cdot F(E) \cdot \exp\left(-\mu_w^p(E) \cdot \left(\int dl\, C_l^p\right) - \mu_w^s(E) \cdot \left(\int dl\, C_l^s\right)\right)}{\int_0^\infty dE\, E \cdot F(E)}\right). \quad \text{EQUATION 3}$$

For various modes of multi-energy scans, the line integral for each ray is collected at higher and lower energies. For a dual energy scan, EQUATION 3 can be used to obtain $P_H$ (i.e., P higher energy) and $P_L$ (i.e., P lower energy), represented herein as $P_{H/L}$. It is to be understood that the notion H/L as utilized herein corresponds to either H (or high) or L (or low) throughout the discussion of the equations.

Substituting $l^p$ for $\int dl\, C_l^p$ and $l^s$ for $\int dl\, C_l^s$ into EQUATION 3, renders EQUATION 4:

$$P_{H/L} = -\log\left(\frac{\int_0^\infty dE\, E \cdot F_{H/L}(E) \cdot \exp(-\mu_w^p(E) \cdot l^p - \mu_w^s(E) \cdot l^s)}{\int_0^\infty dE\, E \cdot F_{H/L}(E)}\right). \quad \text{EQUATION 4}$$

Assuming the tube flux $F_{H/L}(E)$ like the water attenuation profiles components are known, EQUATION 4 includes two relations between $P_{H/L}$ and $l^{p/s}$, and, for each $l^{p/s}$, a collected pair $P_{H/L}$ can be determined corresponding to this ray. It is to be understood that the notion p/s as utilized herein corresponds to either photoelectric or scatter throughout the discussion of the equations.

Due to the one to one correspondence between an input pair $l^{p/s}$ and an output pair $P_{H/L}$, for all practical values of collected line integrals, a look-up table (LUT) can be generated as shown in EQUATION 5:

$$(l^p, l^s) = \text{LUT}(P_H, P_L). \quad \text{EQUATION 5}$$

Multiplying $l^p$ by $\mu_w^p(E_o)$ and $l^s$ by $\mu_w^s(E_o)$, where $E_o$ is an arbitrarily selected energy, the line integral values that would have been collected for a mono-energetic spectrum at $E_o$ for the photoelectric effect and scatter components can be extracted, as shown in EQUATION 6:

$$P^{p/s} = l^{p/s} \cdot \mu_w^{p/s}(E_o). \quad \text{EQUATION 6}$$

wherein $P^{p/s}$ represents $P^p$ and $P^s$.

Using the physical meaning of $P^{p/s}$, the two sinograms $\{P^p\}$ and $\{P^s\}$ can be reconstructed separately to generate photoelectric and scatter images $I^{p/s}$, as shown in EQUATION 7:

$$I^{p/s} = R^{-1}(\{P^{p/s}\}), \quad \text{EQUATION 7}$$

wherein R represents the Radon transform. The images $I^{p/s}$ can be used simultaneously for an image domain material separation and quantification analysis.

Note that in EQUATION 1 the collected line-integrals $P_{H/L}$ do not depend only on $I^{p/s}$ but also on $I^{iodine}$. The accurate impact of a given material intersected by the acquired ray on the collected $P_{H/L}$ depends on the energy-dependent flux profiles $F_{H/L}(E)$ and on the attenuation profile of the given material $\mu_i(E)$. This dependency is influenced by the beam hardening of the spectrum along the ray and cannot be modeled by EQUATION 4 anymore.

As a result, the Hounsfield units of a given material obtained by EQUATIONS 5-7 vary with the object size, position and surrounding composition of the given material. These variations of $I^{p/s}$ for a given material are referred to herein as contrast agent instabilities, and these instabilities can degrade the image-domain material separation and quantification.

The following provides an example description of the landmark approach performed by the landmark determined 426, including examples that show how the calculated landmarks help mitigate the impact the contrast agent instabilities have on the material analysis and a non-limiting approach for determining landmarks.

A two-base model Hounsfield unit (TBM HU) space is defined by a two-dimensional plane where the horizontal axis stands for pixel Hounsfield units in the images $I^p$ and the vertical axis stands for pixel Hounsfield units in the images $I^s$. Using the notations pix to denote the pixel index, each reconstructed pixel can be represented on this plane by a point having the coordinates ($I^p$(pix), $I^s$(pix)). This is referred to herein as the measured point for the pixel since it is calculated from the measured data by EQUATIONS 5-7. The plurality of the points obtained from all the reconstructed pixels ($I^p$\{pix\}, $I^s$\{pix\}) is denoted as the TBM scatter plot. A goal is to neutralize the impact of the contrast agent instabilities on the material separation and quantification.

As described earlier, the instabilities cause the value of ($I^p$(pix), $I^s$(pix)) to depend not only on the material composition within the pixel but also on the beam hardening of the rays that intersect this pixel. For reaching this goal, some reference points or landmarks are calculated on the TBM HU plane. These points help to process later on the scatter plot for material separation and quantification, taking into account the influence of the beam hardening on the TBM scatter plot. These landmarks are obtained by calculating for each pixel its corresponding point on the TBM HU plane assuming a few pre-defined material compounds within the pixel.

Assuming a pre-defined material composition within the pixel is done only for the purpose of calculating the landmarks, and is not to be confused with the TBM scatter plot determined by the true compound within the pixel (but influenced also by the beam hardening). The landmark method can be applied for different materials, e.g. soft tissue, contrast agent, calcium etc. It can also contain clinical compositions e.g. soft tissue plus contrast agent, fat plus Carbon Apatite, etc.

For each pixel, a few landmarks corresponding to different possible compositions are calculated. With the composition index within this group of different compositions denoted by k, a single landmark is denoted by $(L_k^P(pix), L_k^s(pix))$. Calculating the landmarks based on the above is non-trivial, and is described in detail below, after several non-limiting examples (FIGS. 6, 7 and 8) which show how the calculated landmarks help mitigate the impact the contrast agent instabilities have on the material analysis.

Figure 6:
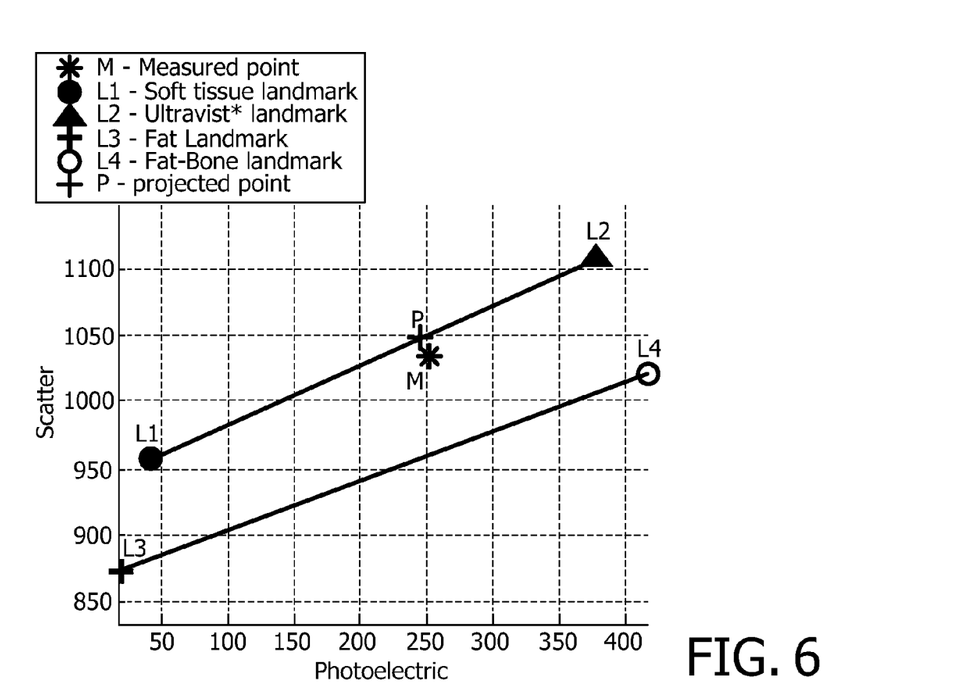
FIGS. 6, 7, and 8 illustrate examples in accordance with the landmark approach described herein.

FIG. 6 shows a first example using landmarks and the TBM HU plane. The x-axis represents the pixels HU in the photoelectric effect and the y-axis represents the scatter images reconstructed after the projection decomposition. Point M represents the measured HU of a given pixel in these images, i.e., $(I^P(pix), I^s(pix))$.

In the given example, the compound within this pixel is identified out of the two following possible different candidates: soft tissue plus some unknown concentration of the Ultravist contrast agent (i.e., an industrial Iodine contrast agent), and a mixture of human fat and Carbon-Apatite, which dominates in human calcifications and bones. The Iodine/calcification density is also to be identified. As such, four landmarks are calculated corresponding to the following different compounds: human soft-tissue, human soft tissue that absorbed Ultravist with an arbitrary density of 36.9 mg/cc, human fat, and a mixture of Human fat and some known density of Carbon-Apatite. These four landmarks are labeled by L1-L4 in FIG. 6.

Note that all landmarks are calculated taking into account not only the corresponding compounds, but also the beam hardening along the different rays that intersect the pixel. This is why using them as reference points helps to neutralize the impact of the contrast agent instabilities.

Using these landmarks, the measured point M is closer to the line $\overline{L_1L_2}$ than to the line $\overline{L_3L_4}$. Therefore, the pixel contains probably a soft tissue plus iodine. The deviation of the measured point from this line is attributed to CT quantum noise. In order to estimate the iodine concentration, the measured point is projected onto the line $\overline{L_1L_2}$ to have P so that the angle $L_1PM$ is a right angle. The ratio of $$\frac{\overline{L_1P}}{\overline{L_1L_2}}$$

is determined, which equals in this example to 0.6. According to this ratio, it is deduced that the Ultravist concentration within the pixel is about 0.6 times 36.9 mg/cc, which is about 22.1 mg/cc.

Figure 7:
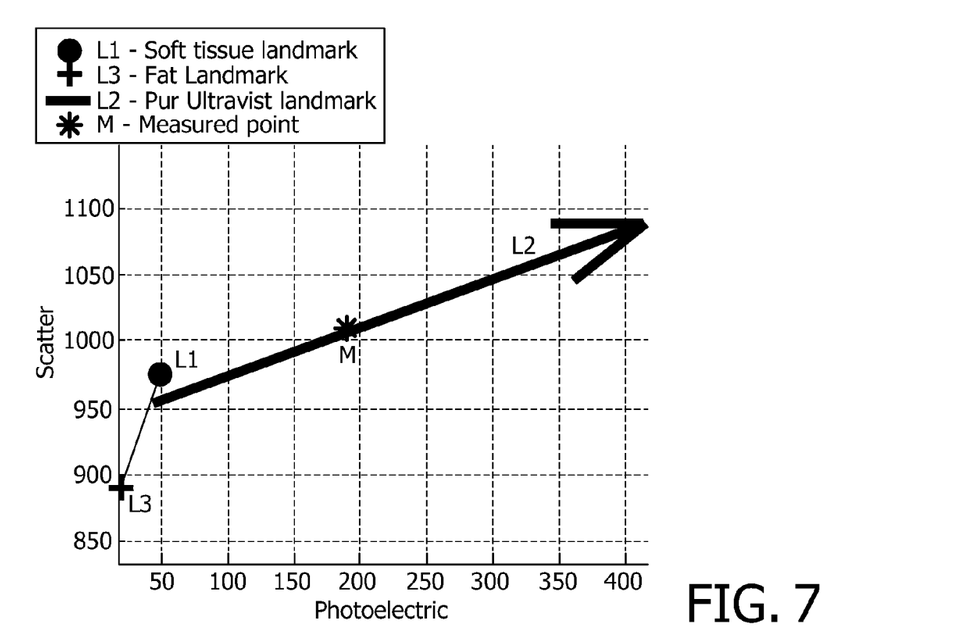

FIG. 7 shows a second example using landmarks and the TBM HU plane. In this example, it is assumed, a-priori, that the content of the pixel is a sum of some mixture between a healthy soft tissue and fat, plus some unknown Ultravist concentration. As in the previous example, the attenuation profiles of fat and the healthy soft tissue are known a-priori.

In this case, the iodine concentration is found in the following way. First, as in the previous example, the landmarks L1 and L3 are calculated for the soft tissue and fat correspondingly. In addition, a landmark for a pure Ultravist known concentration of 36.9 mg/cc L2 is calculated. This landmark has a different meaning than the landmark L2 in FIG. 6 since now it is calculated for pure Ultravist instead of for the sum of soft tissue and pure Ultravist.

Since pure Ultravist does not exist alone within the patient, the new landmark does not correspond to a point that can be measured in reality on the TBM HU plane. Instead, it is now used as a vector, as shown by the arrow in FIG. 7. With L1-L3 calculated, according to the a-priori assumptions, EQUATION 8 must be satisfied (disregarding image noise).

$$\alpha \cdot \vec{L1} + (1-\alpha) \cdot \vec{L3} + \beta \cdot \vec{L2} = \vec{M}. \quad \text{EQUATION 8}$$

Here, the arrows come to remind that EQUATION 8 is a system of two scalar equations, i.e., for the scatter and photoelectric effect coordinates of the TBM HU plane. It contains two unknowns: $\alpha$, which stands for the weight of the soft tissue within the mixture of soft-tissue and fat, and $\beta$, which stands for the ratio between the true Ultravist concentration in the pixel and the arbitrary concentration of 36.9 mg/cc associated with L2.

Using EQUATION 8, the values of $\alpha$ and $\beta$ can be found since L2 is not parallelizing the vector L3-L1. Finally, note that in the present example, the locations of L1 and L3 differ slightly from their counterparts in FIG. 6. Also, L2 in the present example differs from the vector defined by L2-L1 from the previous example. These differences reflect how agent contrast instabilities change both the measured points and the calculated landmarks within the patient or from one patient to another.

In the previous example, it was shown how to calculate the Ultravist concentration for the case where the substrate composition is known a-priori to be a mixture of two compositions with known attenuation profiles. This information might not be available for some clinical cases. For such cases, there is still a chance to find the Ultravist concentration map in the following way.

Using techniques like the density plot described in US publication 2010/0328313 A1, it might be possible to identify within the TBM HU plane a density peak corresponding to object pixels free of Ultravist. With this identification, calculating the landmark for pure Ultravist will be sufficient for extracting the Ultravist concentration map in connection with FIG. 8.

Figure 8:
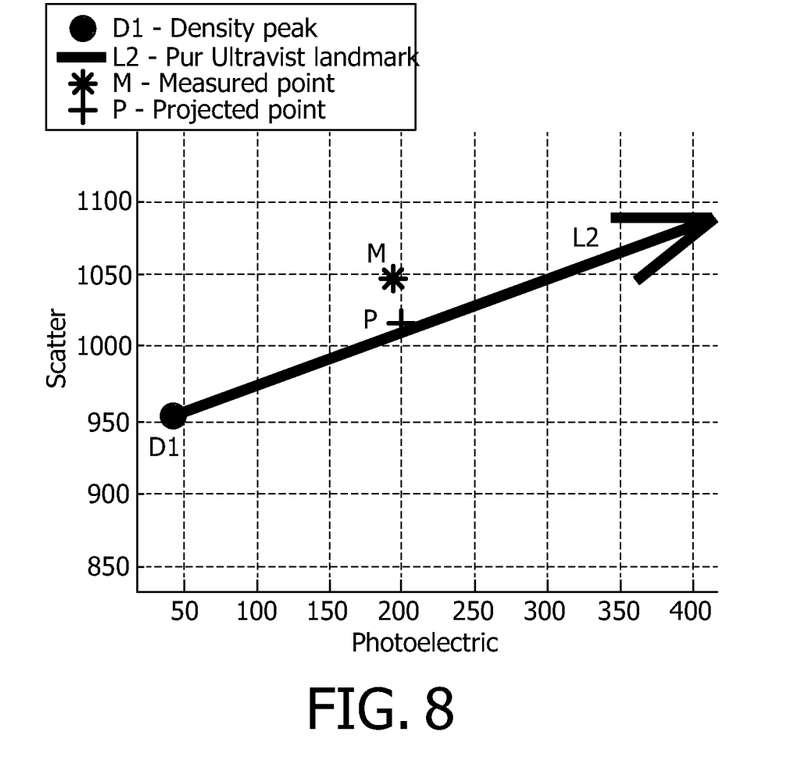

Here, the density peak D1 replaces the calculated landmark L1 of FIG. 6, and the vector L2 is the pure Ultravist landmark as in FIG. 7. The point P is obtained by projecting the measured point M on the line (D1, D1+L2), so that $\overline{MP}$ is perpendicular to L2. The concentration of the Ultravist in the pixel is estimated by multiplying the concentration associated with L2 by the ratio of $$\frac{\overline{D1P}}{|L2|}.$$

As stated above for each pixel, a few landmarks corresponding to different possible compositions are calculated, and calculating the landmarks is non-trivial. The following described an approach that shows how to predict the measured point for the pixel that would have been obtained if the true object composition only at the location of this pixel had been replaced by the composition k, neglecting the finite spatial resolution.

The composition of pixel pix impacts the measured photoelectric effect and scatter coordinates through the attenuation of rays that intersect the pixel. Such rays having different fan and cone angles are also passing different paths within the patient. Due to all these reasons, their spectra, when reaching the detectors, are different. Therefore, the way the composition in pix is influencing the readings of these rays, i.e., $\{P^{p/s}(\text{pix})\}$ is different. For finding this influence, the spectra of these rays when reaching the detectors is first found. It is known how to model the spectra $F_{H/L}$ emitted from the tube towards each different detector pixel.

When some materials cannot be described by a linear combination of $\mu_w^p(E)$ and $\mu_w^s(E)$, $I^p$ and $I^s$ are not well defined anymore. Nevertheless, for estimating the spectra reaching the detector, the TBM approximation is used as follows. First, a LUT is determined and used in EQUATION 5 to obtain the decomposed paths $\{I^{p/s}(\text{pix})\}$ from the measured line integrals. Then, the spectra at the detectors are estimated for all rays that intersect the pixel as follows as shown in EQUATION 9:

$$F_{H/L}^d(E,r) = F_{H/L}(E,r) \cdot \exp(-I^p(r) \cdot \mu_w^p(E) - I^s(r) \cdot \mu_w^s(E)). \quad \text{EQUATION 9}$$

Here the variable r stands for the ray, and the superscript d stands for the flux at the detector. EQUATION 9 is basing on the TBM approximation. Following the next steps described below, it can be shown that using this approximation leads to negligible errors in the calculated landmark compared with the contrast agent instabilities. This is especially true when the contrast agent is responsible only for a small part of the attenuation along the path of each ray through the patient.

Now, the spectra at the detector that would have been obtained if in addition to the measured attenuation, the ray had to pass an additional small path along the composition k using, is estimated using EQUATION 10:

$$F_{H/L}^{k,\delta}(E,r) = F_{H/L}^d(E,r) \cdot \exp(-\delta \cdot \mu_k(E)). \quad \text{EQUATION 10}$$

Here, $\delta$ is the small path (e.g. 1 mm), and $\mu_k(E)$ is the attenuation profile of the composition associated with landmark k. The last variables are used to calculate the line integrals that would have been collected if in addition to the attenuation in practice, the rays intersecting the pixel had to pass an additional small path $\delta$ through the composition k, as shown in EQUATION 11:

$$P_{H/L}^{k,\delta}(r) = -\log\left(\frac{\int_0^\infty dE \, E \cdot F_{H/L}^{k,\delta}(E,r)}{\int_0^\infty dE \, E \cdot F_{H/L}(E,r)}\right). \quad \text{EQUATION 11}$$

The procedure described in connection with EQUATIONS 5-6 is repeated, taking now as an input $P_{H/L}^{k,\delta}(r)$, rendering EQUATIONS 12 and 13:

$$(I^{p,k,\delta}(r), I^{s,k,\delta}(r)) = \text{LUT}(P_H^{k,\delta}(r), P_L^{k,\delta}(r)), \text{ and} \quad \text{EQUATION 12}$$

$$P^{p/s,\delta} = I^{p/s,\delta} \cdot \mu_w^{p/s}(E_o). \quad \text{EQUATION 13}$$

Note that applying EQUATIONS 9-12 for $\delta=0$ would result in the $I^{p/s}$ calculated by EQUATION 5. This is because EQUATION 4 is the inverse of EQUATION 5 independently of the TBM approximation involved in EQUATION 4.

The photoelectric effect and scatter attenuation coefficients associated with the ray r and the composition k can be defined as shown in EQUATION 14:

$$\mu^{p/s,k}(r) = \frac{P^{p/s,k,\delta}(r) - P^{p/s}(r)}{\delta}; \delta << 1 \text{ cm.} \quad \text{EQUATION 14}$$

Figure 9:
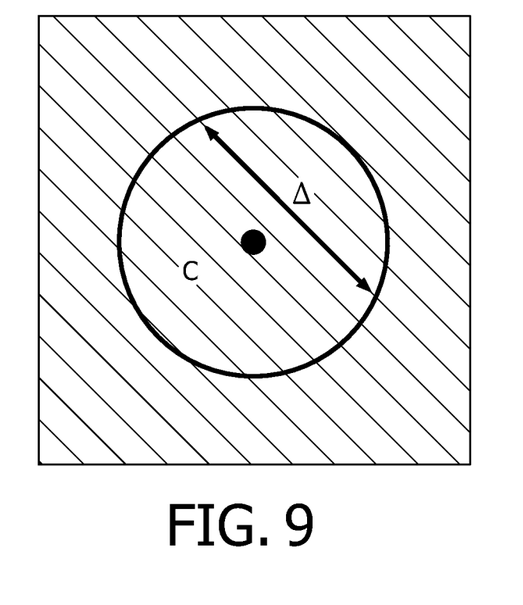
FIG. 9 illustrates a connection between calculated projection readings and landmarks.

FIG. 9 illustrates an example that shows how the energy independent coefficients $\mu^{p/s,k}(r)$ (E0 is a fixed energy necessary to scale the material line integrals $P^{p/s}$ to a more familiar unit) can be used to obtain the desired landmark photoelectric effect and scatter coordinates shown in FIGS. 6-8.

FIG. 9 illustrates a 2D image reconstructed by a circular single slice CT scan. Here, the dot in the middle represents the center of the reconstructed pixel. The circle concentric to it represents a circular small region denoted by C. Replacing the composition within C by air would result in images $I^{p,\alpha}(I^{s,\alpha})$ reconstructed according to EQUATION 7 that will have zero values at the pixel, i.e., $I^{p/s,\alpha}(\text{pix})=0$.

Note that air can be expressed accurately as the trivial linear combination of the water photoelectric and scatter components, i.e., $C_i^{p/s}=0$. The landmark coordinates can be expressed as shown in EQUATION 15:

$$L_k^{p/s}(\text{pix}) \equiv I^{p/s,k}(\text{pix}) = I^{p/s,k}(\text{pix}) - I^{p/s,\alpha}(\text{pix}). \quad \text{EQUATION 15}$$

According to the conventional filter back-projection (FBP) reconstruction method, the reconstructed image is obtained as a sum of different contributions from different projections indexed by the angle $\theta$ as shown in EQUATION 16:

$$I = \sum_\theta I(\theta). \quad \text{EQUATION 16}$$

Combining EQUATIONS 15 and 16, renders EQUATION 17:

$$L_k^{p/s}(\text{pix}) = \sum_\theta I^{p/s,k}(\text{pix},\theta) - I^{p/s,\alpha}(\text{pix},\theta) \equiv \sum_\theta I^{p/s,k-\alpha}(\text{pix},\theta). \quad \text{EQUATION 17}$$

In EQUATION 17, the difference between the contributions for the pixel from the projection $\theta$ by $I^{p/s,k-\alpha}(\text{pix},\theta)$ is defined. This differential contribution is proportional to the BP weight $w_\theta(\text{pix})$. Independently, following the description below this differential contribution is also proportional to $\mu^{p/s,k}(r(\text{pix},\theta))$.

From FIG. 9, note that due to the small size of the region C, the value of $\mu^{p/s,k}(r(\text{pix},\theta))$ for every ray belonging to the projection $\theta$ and intersecting this region is fixed. Furthermore, C is small enough so that these values calculated based on the collected sinograms hardly change if the object composition within C is replaced by air. Let $\Delta$ stand for the intersection path of any of these rays with C.

Due to the small size of C, the increase of the line integrals $P^{p/s}$ corresponding to any of these rays attributed to the replacement of air by composition k can be expressed as shown in EQUATION 18:

$$\Delta P^{p/s}(r) \approx \mu^{p/s,k}(r) \cdot \Delta(r). \quad \text{EQUATION 18}$$

Combining this together with the linearity of the convolution with a ramp filter completes the proof of a proportionality between $I^{p/s,k-\alpha}(\text{pix},\theta)$ and $\mu^{p/s,k}(r)$.

Due to the proportionality ratio of $I^{p/s,k-\alpha}(pix,\theta)$ with respect $w_\theta(pix)$ and $\mu^{p/s,k}(r)$, as well as due to the lack of any other factor that impacts $I^{p/s,k-\alpha}(pix,\theta)$ in a way that varies between different projections, renders EQUATION 19:

$$L_k^{p/s}(pix) = \sum_\theta I^{p/s,k-\alpha}(pix, \theta) = \frac{1000}{\mu_w^p(E_0) + \mu_w^s(E_0)} \cdot \sum_\theta \hat{w}_\theta(pix) \cdot \mu^{p/s,k}(r(pix, \theta)),$$ EQUATION 19 wherein $\hat{w}_\theta$ are the normalized BP weights that sum together to one, and the first term in the right hand side is responsible for expressing the result in HU. EQUATION 19 shows how to use the calculated attenuation coefficients defined in EQUATION 14 for finding the landmarks. Note that this result holds also for three dimensional backprojection (3D BP).

The landmark method can also be applied when an iterative method is used for image reconstruction of the photoelectric and scatter images. In this case, averaging angularly $\mu^{p/s,k}(r(pix,\theta))$ for all projections is more challenging since it is impractical to follow all iterations and calculate the final contribution of different projections to the reconstructed pixel. Nevertheless, estimating the flux at the detectors allows estimating reasonably the relative contributions of different projections, and replacing the BP weights $\hat{w}_\theta$ in EQUATION 19 by these relative contributions in order to get the landmarks.

Figure 10:
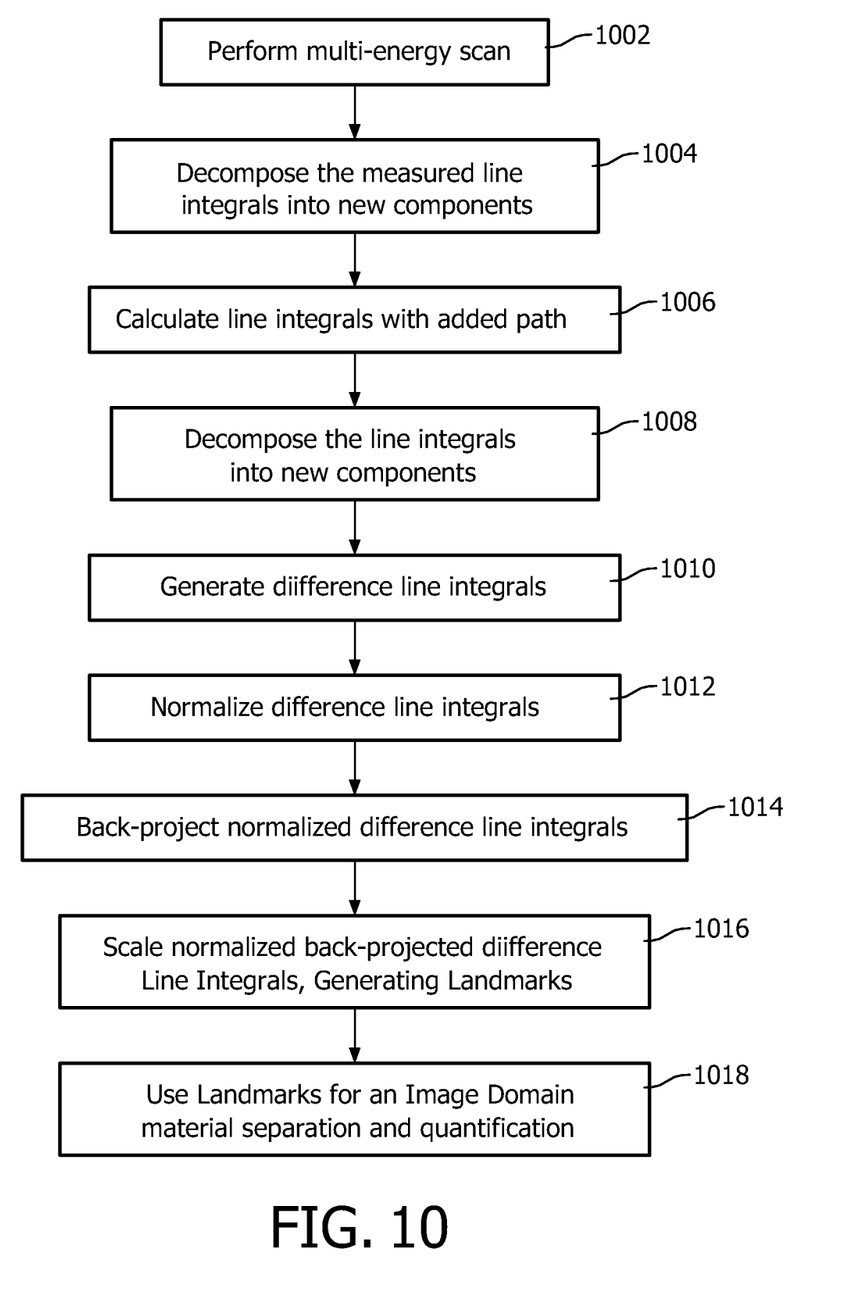
FIG. 10 illustrates an example method for generating and using landmarks.

FIG. 10 illustrates a method for employing the landmark approach described herein.

At 1002, a multi-energy scan is performed, producing collected line integrals for the polychromatic spectra at the different energies.

At 1004, a two-base decomposition is performed on the collected line integrals, decomposing these line integrals into scatter and photoelectric water components.

At 1006, line integrals that would have been measured for different energies after adding to the original paths an additional path segment of a small length through the known attenuation profile of the material under consideration are calculated.

This calculation is based on adding a predetermined path of the at least one material of interest to the calculated paths through the two water components, and also based on the known spectra at the different energies and the known attenuation profiles of the water components and the material of interest.

At 1008, a two-base decomposition is performed on the calculated line integrals, decomposing these line integrals into scatter and photoelectric components.

At 1010, the decomposed collected line integrals are subtracted from decomposed line integrals calculated with the additional path, generating difference line integrals for the scatter and the photoelectric components.

At 1012, the difference line integrals are normalized by dividing them by the additional path.

At 1014, the normalized difference line integrals are back-projected.

At 1016, the back-projected data is scaled by a factor that produces the location of the landmark for the material under consideration in the scatter photoelectric HU space.

At 1018, the landmarks are used to facilitate an image domain material separation and/or quantification as described herein.

The above may be implemented by way of computer readable instructions, which when executed by a computer processor(s), cause the processor(s) to carry out the described acts. In such a case, the instructions can be stored in a computer readable storage medium associated with or otherwise accessible to the relevant computer. Additionally or alternatively, one or more of the instructions can be carried by a carrier wave or signal.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A method, comprising:
   calculating, with a processor, line integrals based on collected line integrals decomposed into at least two different components, an artificial path length of a material of interest added to the paths of rays corresponding to the collected line integrals, an attenuation profile of the material of interest, and polychromatic spectra at the multiple energies;
   generating, with the processor, landmarks, for different compositions of materials in scanned structure, based on the calculated line integrals, wherein a landmark represents a location of a composition of materials, distorted by beam hardening, in a multi-energy Hounsfield Unit space; and
   using the landmarks to perform, with the processor, an image domain material separation and quantification.

2. The method of claim 1, wherein the image domain material separation and quantification is substantially free of beam hardening artifact.

3. The method of claim 1, generating the landmarks, further comprising:
   determining difference line integrals by subtracting the decomposed components of the collected line integrals from the decomposed components of the line integrals calculated after adding the artificial path length of the material of interest to the paths of the rays corresponding to the collected line integrals; and
   generating the landmarks based on the difference line integrals.

4. The method of claim 3, generating the landmarks, further comprising:
   dividing the difference line integrals by the additional artificial path length; and
   back-projecting the difference line integrals divided by the additional artificial path length, generating the landmarks.

5. The method of claim 4, the back-projecting, comprising: performing an angular averaging.

6. The method of claim 4, further comprising:
   scaling the back-projected difference line integrals to Hounsfield units, generating the landmarks.

7. The method of claim 4, wherein the back-projecting includes employing an iterative reconstruction that uses an estimated back-projection weights.

8. The method of claim 1, generating the landmarks, further comprising:
   decomposing the collected line integrals into at least two different components.

9. The method of claim 1, wherein the different components of the decomposed collected line integrals and the different components of the decomposed line integrals calculated for finding the landmarks both include a scatter component and a photoelectric effect component.

10. The method of claim 1, wherein the different components of the decomposed collected line integrals and the different components of the decomposed line integrals calculated for finding the landmarks both include a water component or a contrast agent component.

11. The method of claim 1, wherein the different components of the decomposed collected line integrals and the different components of the decomposed line integrals calculated for finding the landmarks both include a water component or a calcium component.

12. The method of claim 1, further comprising:
generating the landmarks for a sub-set of pixels of an image; and
deriving by an interpolation landmarks of other pixels of the image based on the generated landmarks.

13. A system, comprising:
a line integral calculator configured to calculate line integrals based on collected line integrals decomposed into at least to two different components, an artificial path length of a material of interest, an attenuation profile of the material of interest, the polychromatic spectra at the multiple energies, and detector spectral responsivity;
a decomposer that decomposes the calculated line integrals into at least two different components;
a displacement vector determiner that subtracts decomposed collected line integral components from the decomposed calculated line integral components, generating difference decomposed line integral components and that divides the difference decomposed line integral components by the artificial path length;
a back-projector that back-projects the difference decomposed line integral components; and
a scaler that scales the back-projected difference decomposed line integral components into Hounsfield units, generating landmarks,
wherein a landmark represents a location of a composition of materials, distorted by beam hardening, in a multi-energy Hounsfield Unit space.

14. The system of claim 13, further comprising:
a data analyzer that performs an image domain material separation and quantification based on reconstructed image data and the landmarks.

15. The system of claim 14, wherein the image domain material separation and quantification is free of beam hardening artifact.

16. The system of claim 13, wherein the at least two different components include a scatter component and a photoelectric effect component.

17. The system of claim 13, wherein the line integral calculator (504) calculates the line integrals by adding the artificial path length to a path through different materials of the collected line integrals.

18. The system of claim 13, wherein the back-projector generates the landmarks for a sub-set of pixels of an image and landmarks for other pixels of the image are determined by interpolating the generated landmarks.

19. A non-transitory computer readable storage medium encoded with computer readable instructions, which, when executed by a processor of a computing system, causes the processor to:
utilize images reconstructed from collected line integrals decomposed components and calculated landmarks to perform an image domain material separation and quantification that is substantially free of beam hardening artifact, wherein the landmarks are generated based on line integrals calculated based on the collected line integrals decomposed into at least two different components, an artificial path length of a material of interest added to the paths of rays corresponding to the collected line integrals, an attenuation profile of the material of interest, and polychromatic spectra at the multiple energies.

* * * * *